(12) United States Patent
White

(10) Patent No.: US 8,096,429 B2
(45) Date of Patent: Jan. 17, 2012

(54) COMESTIBLE FLUID RACK WITH CONDUIT ROUTING SYSTEM

(76) Inventor: Keith D. White, Mansfield, TX (US)

( * ) Notice: Subject to any disclaimer, the term of this patent is extended or adjusted under 35 U.S.C. 154(b) by 288 days.

(21) Appl. No.: 12/395,641

(22) Filed: Feb. 28, 2009

(65) Prior Publication Data

US 2010/0219141 A1     Sep. 2, 2010

(51) Int. Cl.
*A47F 5/00* (2006.01)
(52) U.S. Cl. ........................................................ 211/134
(58) Field of Classification Search .................. 211/183, 211/94.01, 70.6, 189, 175, 134, 204, 71.01, 211/191; 248/149, 150, 153
See application file for complete search history.

(56) References Cited

U.S. PATENT DOCUMENTS

| 5,917,694 | A * | 6/1999 | Denny | 361/643 |
|---|---|---|---|---|
| 6,254,041 | B1 * | 7/2001 | Dufourg | 248/65 |
| 6,834,768 | B2 * | 12/2004 | Jersey et al. | 211/189 |
| 7,225,936 | B2 * | 6/2007 | Jersey et al. | 211/189 |
| 7,637,771 | B2 * | 12/2009 | Laursen | 439/501 |
| 2006/0266726 | A1 * | 11/2006 | Swanson | 211/186 |
| 2007/0012639 | A1 | 1/2007 | Bixler | |
| 2007/0017883 | A1 * | 1/2007 | Bridges et al. | 211/26 |
| 2007/0278171 | A1 * | 12/2007 | Jersey et al. | 211/188 |
| 2010/0219141 | A1 * | 9/2010 | White | 211/71.01 |

* cited by examiner

*Primary Examiner* — Jennifer E. Novosad
(74) *Attorney, Agent, or Firm* — James Sonntag; Amy Fione

(57) ABSTRACT

A rack for comestible fluids with conduit portals in front and rear rails for passage and support of the conduits passing from the fluid container to the pump.

13 Claims, 6 Drawing Sheets

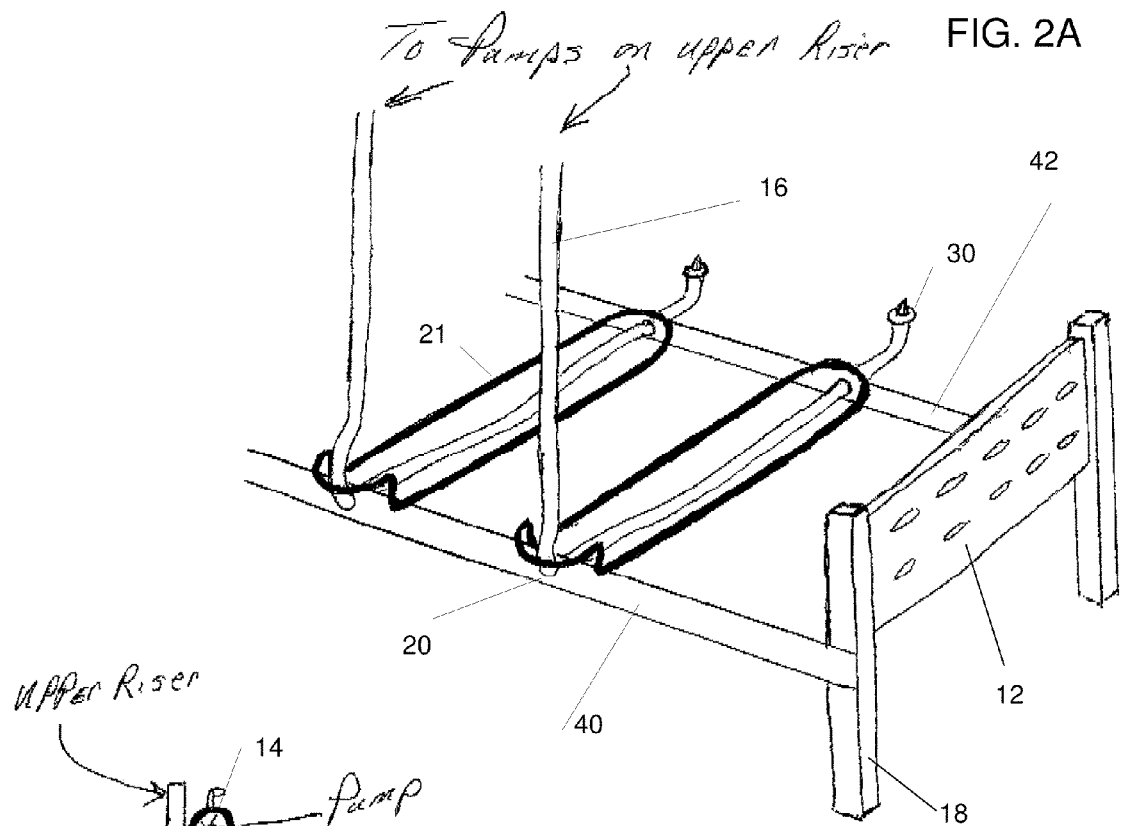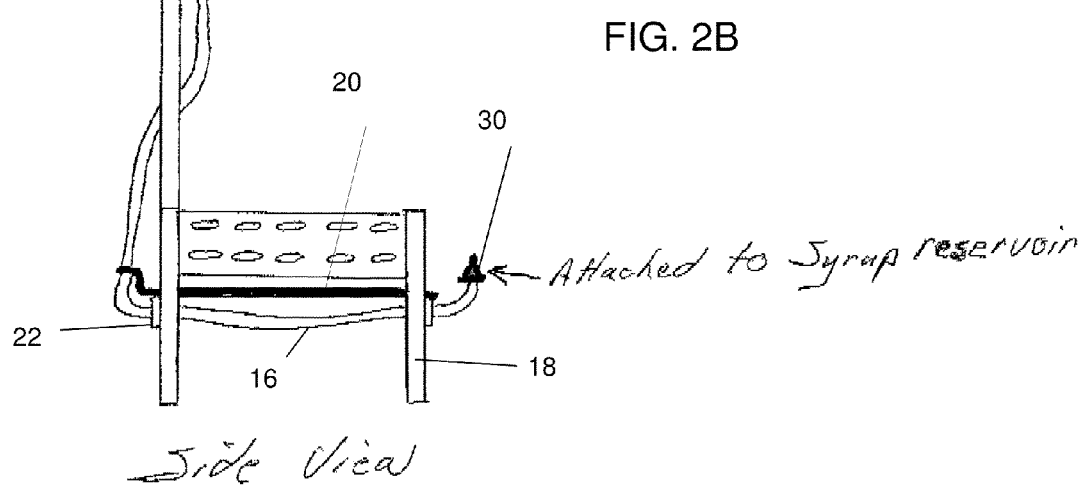

COMESTIBLE FLUID RACK WITH CONDUIT ROUTING SYSTEM

CROSS REFERENCE TO RELATE APPLICATIONS

This application claims priority from U.S. Provisional Patent Application 61/021,416, filed 28 Feb. 2008.

BACKGROUND OF INVENTION

Racks of many different configurations are currently available in the food and beverage industry. An example of a fluid container commonly used in the food and beverage industry is the "bag-in-box" container, whereby a comestible fluid (such as a beverage, a syrup or other beverage concentrate, and the like) is contained within a bag enclosed within a box for support. A tap and pump is often employed to extract the comestible fluid from the bag. For example, a tap can be positioned toward the bottom of the bag to enable the fluid to be more completely removed from the bag via a conduit between the tap and pump. Pumps, one for each of the installed containers are mounted on the rack, for example on panels or horizontal rails one one or both ends of the rack.

An exemplary rack configuration has generally horizontal front and rear rails with racks or support s extending front to back that support a container and allow the container to be slid on and off of the racks. Several racks supports are mounted side by side along the length of the front and rear rails to allow holding of multiple containers along the length of the rack. Rails with support rails are also disposed vertically a on different levels or "shelves, to allow containers to be mounted one above one another.

During installation, a container is usually mounted in an empty position on the rack, the container is tapped with an end of a conduit, and the other end of the conduit is attached to a pump, usually on either side of the rack or on a panel at the top. The conduit on its path between the container and the pump has to be supported to keep it out of other containers that have to be removed or installed. Since most racks have several containers, each with a conduit leading to a pump, it can be a problem to secure all of the conduits in an organized and easy fashion. Currently conduits are usually secured by using ratchet zip ties or wire ties to secure a conduit a structural member of the rack. Such an installation is shown in FIG. 1, which is from United States Patent Application Publication 2007/0012639. showing front rails, rear rails racks, pumps and conduits with conduits ready to be attached to a container, with ties attaching the conduits to rails on the rack.

A problem with this system is the labor required to find a suitable attachment point on the rack, to position a conduit at this point, then to find and manipulate a tie around the rack and the conduit, and to finally tighten the tie. In addition, the installed ties have one or more dangling ends. With many containers and conduits, this can be an unnecessarily long process. The ends of the ties can be left as it or cut, but in either case ends are left that tend to interfere with an installers operation and maintenance of the racks and containers. In addition, the tends to snag on skin and clothing. The ends are often cut in an attempt to minimize this the problem, but the cut end is often sharp and can more easily cut hands and arms, and tear clothing as an installer is installing the removing containers.

SUMMARY OF INVENTION

The present system involves a way to route conduits between a container and a pump in a way that requires less labor to install, and requires only an insignificant increase in manufacturing costs of a rack system. In addition, there is no requirement to "attach" the conduits, so the system is without any ties. According, the possibility injury from ties and their sharp ends is eliminated, as well as the time and labor it take to install the ties.

BRIEF DESCRIPTION OF DRAWINGS

FIGS. 2A and 2B are is a perspective views of the present system.

DETAILED DESCRIPTION

Figure 1:
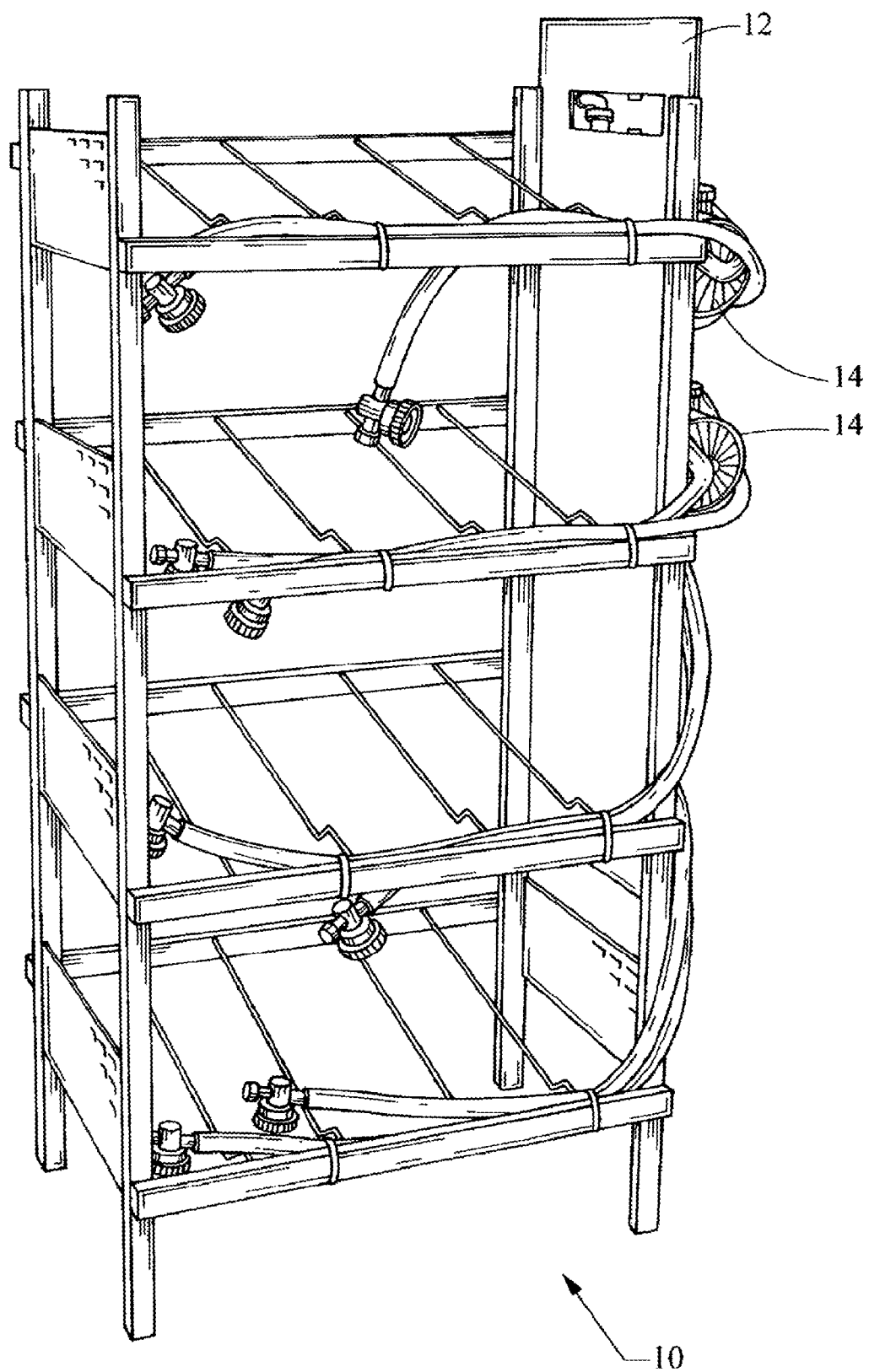
FIG. 1 is a perspective view of prior-art system.
Figure 3:
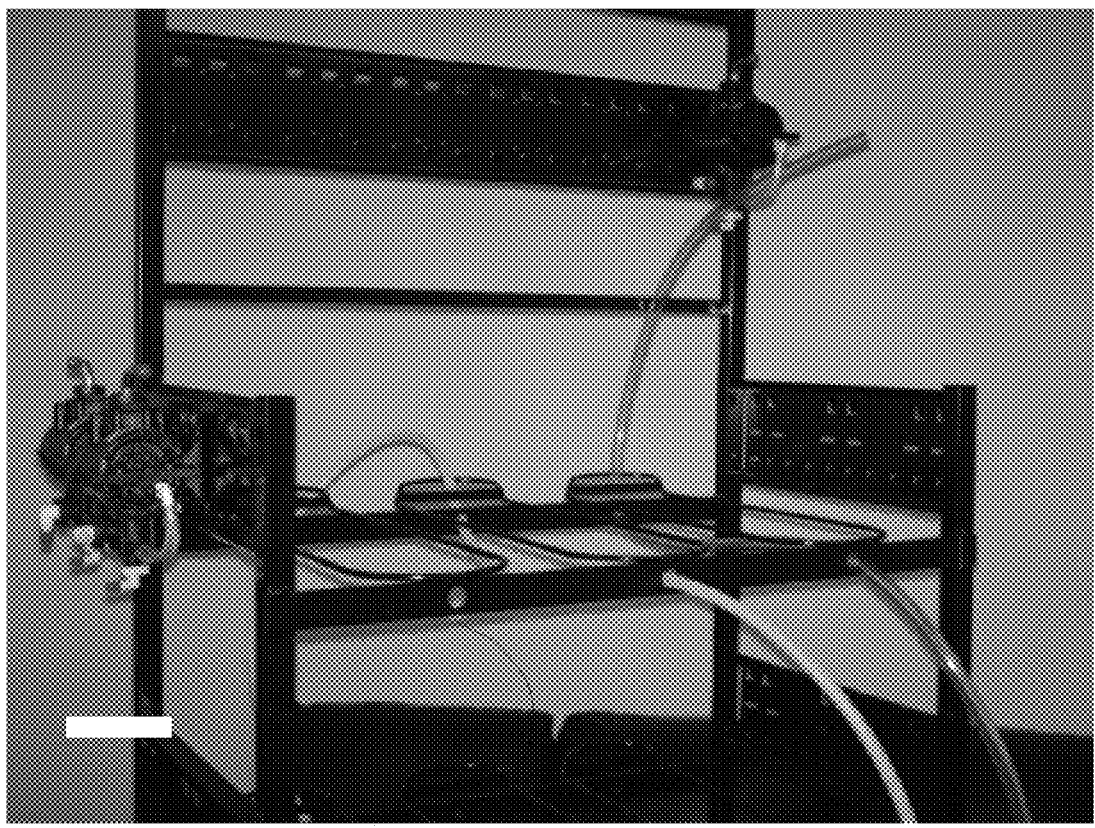
FIG. 3 is a a photograph illustrating the present system.
Figure 4:
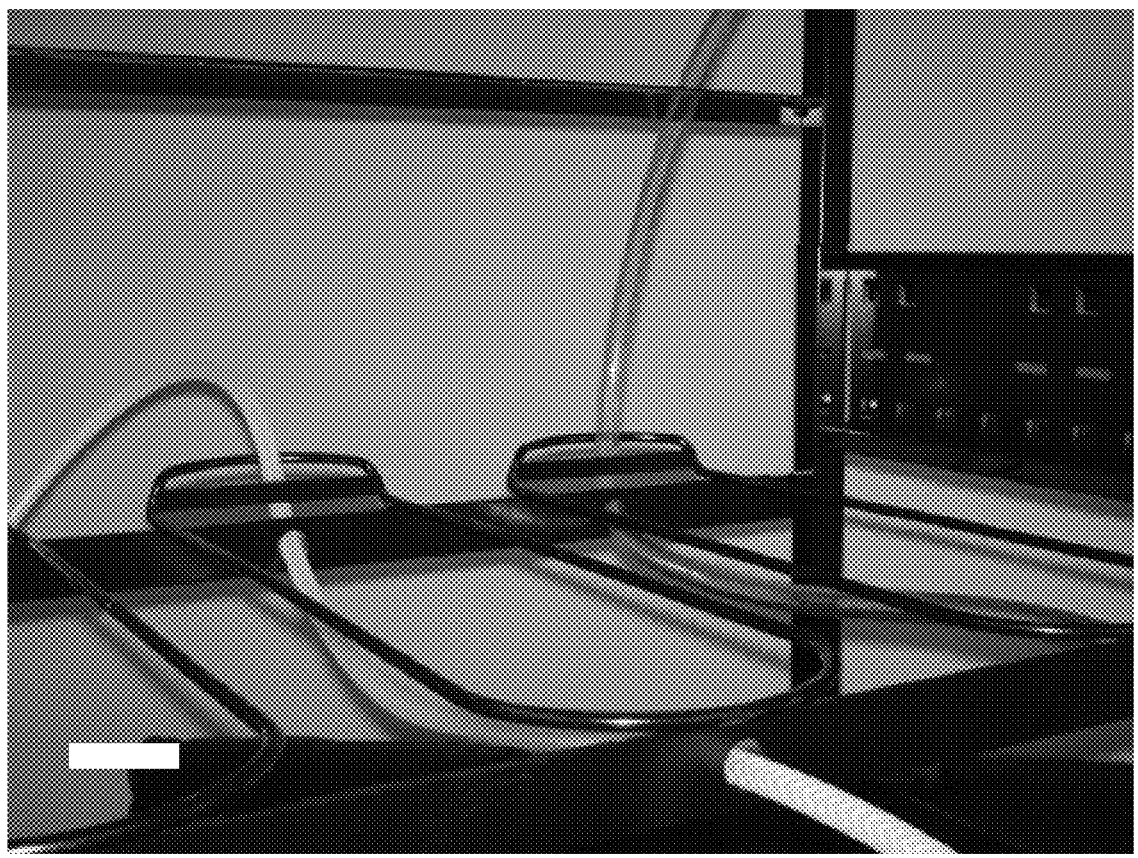
FIG. 4 is a a photograph illustrating the present system.
Figure 5:
FIG. 5 is a a photograph illustrating the present system.
Figure 6:
FIG. 6 is a a photograph illustrating the present system.

Reference is made to FIGS. 2A, 2B, 3, 4, 5, and 6.

An embodiment is a rack for containers of comestible fluids comprising generally vertical upright members 18 with front and back rails 42, 40 extending generally horizontally between the upright members 18. Support rails 21 extend between the front and back rails and are constructed to provide at least one container station, where a container can be held. Several container stations are usually provided on the rack by having container stations side by side along the front rail, and having the stations stacked vertically.

One or more pump stations are provided for supporting enough pumps 14 to service all of the containers that may be mounted on the rack. The pump stations can be an any convenient location, such on a side panel, or a panel extending up from the back of the rack.

Conduits 16 extend between a first end 30 and a second end 32 of the conduit. The first end of a conduit is at one of the container stations and is adapted for attachment to an outlet of the container. The second end is at one of the pump stations and is adapted to attach to a pump.

To support the conduits, conduit portals 20 are provided in the front and rear rails 42, 40. At least one conduit portal is provided in the front rail and in the rear rail for each container station. The conduit portal is positioned in the front rail either above or below at some location near the container station, so that a conduit emerging from the conduit portal is conveniently attached to tapped to the container outlet. The conduit portal in the rear rail generally is in a position generally opposing the conduit portal in the front rail to provide a supported passage of the conduit from the front rail to the back rail. In FIGS. 2A and 2B, for each container station there is one conduit portal below the pump station in both the front and rear rails for supported passage of the conduit directly under the support rails 21.

The conduit portal can be configured as a hole in the rail. Any other suitable construction is suitable, such as a loop or open hook attached to the bottom or top edge of the rail. However, to obtain the best advantages, construction of the conduit portal should be simple, of low cost, and avoid any unnecessary extensions and sharp edges that may injure an installer. Holes are suitable because they can be easily punched into the rails at fabrication of the rails. The dimension and shape of the hole is anything suitable. Round or ovoid holes avoid sharp edges, but other shapes are suitable. The hole are dimensioned for an installer to easily pass either end of the conduit through the hole. The holes may also have grommets or liners at the edges of the hole to protect from sharp edges that may injure the installer or damage the conduit.

As exemplified in FIGS. 2A and 2B, the path of the conduit from the container station to the pump station is from the container station, through a convenient or near-by conduit on the front rail below the container station, under the container station through a conduit in the rear rail, and up along the back of the rack to the pump station. Other paths are contemplated, and will depend in part on the configuration and design of the rack. For example, the conduit may pass through a convenient conduit portal about the container station, and after it emerges from the rear conduit portal pass laterally to a pump station on a side panel.

By use of this system, the conduits can be easily installed. No ties are required, and danger and inconvenient from sharp edges and ends is greatly mitigated.

What is claimed is:

1. A rack for containers of comestible fluids comprising:
    generally vertical upright members;
    front and back rails extending generally horizontally between upright members;
    support rails extending between front and back rails and adapted to support a container and provide at least one container station,
    at least one pump station attached to the rack adapted for supporting a pump for pumping fluid from a container;
    at least one conduit extending between a first end, the first end at or near a container station and adapted to attach to an outlet of a container, and the second end at or near the pump station and adapted to attach to the pump;
    at least one conduit portal in the front or back rails for passage of the conduit through the rail, the conduit portal constructed to support the conduit without separate attachment structure and allow insertion or removal of the conduit.

2. A rack as in claim 1 wherein at least one conduit portal is near a container station and is in at least one of the front rail and the rear rail.

3. A rack as in claim 2 wherein at least one conduit portal is in the front rail and the rear rail.

4. A rack as in claim 3 wherein the conduit portal in the front rail is in generally opposing relationship to the conduit portal in the rear rail to provide support for the conduit passing from the front rail to the rear rail.

5. A rack as in claim 1 wherein the conduit portals are configured as one or more of a hole in the rail, a loop attached to the rail, and or open hook attached to the rail.

6. A rack as in claim 5 wherein the conduit portal is configured as a hole.

7. A rack as in claim 6 wherein the hole is ovoid or round.

8. A rack as in claim 1 wherein the conduit portal is near or at the pump station.

9. A rack as in claim 8 wherein at least one conduit portal is near the container station and is in at least one of the front rail and the rear rail.

10. A rack as in claim 9 wherein at least one conduit portals is in the front rail and the rear rail.

11. A rack as in claim 10 wherein the conduit portal in the front rail is in generally opposing relationship to the conduit portal in the rear rail to provide support for the conduit passing from the front rail to the rear rail.

12. A rack for containers of comestible fluids comprising:
    generally vertical upright members;
    front and back rails extending generally horizontally between upright members;
    support rails extending between front and back rail and adapted to support a container and provide at least one container station,
    at least one pump station attached to the rack adapted for supporting a pump for pumping fluid from a container;
    at least one conduit extending between a first end, the first end at or near a container station and adapted to attach to an outlet of a container, and the second end at or near the pump station and adapted to attach to the pump;
    at least one conduit portal in the front and back rails for passage of the conduit through the rail, the conduit portal constructed to support the conduit without separate attachment structure and allow insertion or removal of the conduit,
    wherein at least one conduit portal is situated at or near a pump station on the front or rear rail.

13. A rack as in claim 12 wherein the conduit portal in the front rail is in opposing relationship with the conduit portion in the rear rail to provide support for the conduit passing from the front rail to the rear rail.

* * * * *